E. W. RUSSELL.

TUMBLER WASHERS.

No. 7,380. Reissued Nov. 7, 1876.

Witnesses:

John W. Taylor

Geo. W. Taylor

Inventor:

E. Walton Russell

UNITED STATES PATENT OFFICE.

EDWARD WALTON RUSSELL, OF BALTIMORE, MARYLAND.

IMPROVEMENT IN TUMBLER-WASHERS.

Specification forming part of Letters Patent No. 72,911, dated December 31, 1867; reissue No. 7,380, dated November 7, 1876; application filed August 9, 1876.

*To all whom it may concern:*

Be it known that I, EDWARD WALTON RUSSELL, of the city of Baltimore, in the county of Baltimore and State of Maryland, have invented certain new and useful Improvements in an Automatic Tumbler-Washer; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
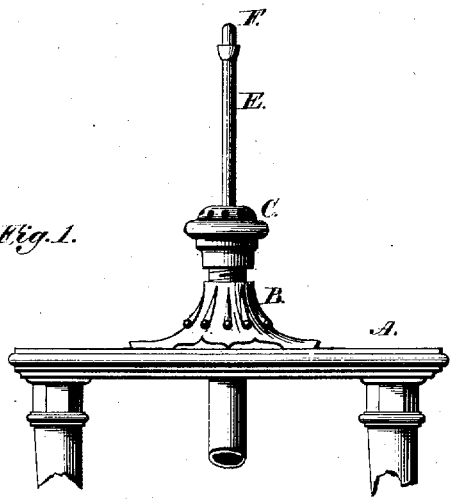
Figure 2:
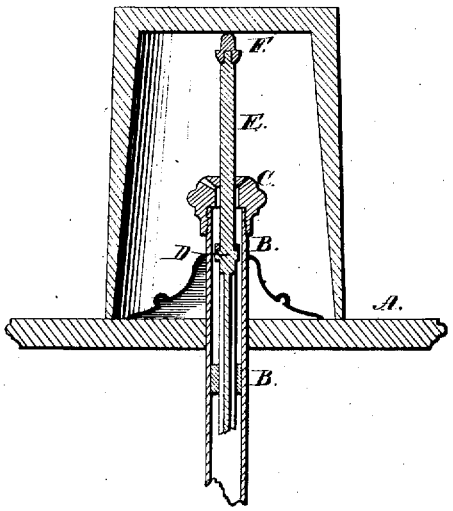

Figure 1 is a side elevation of an apparatus with my improvements. Fig. 2 is a vertical section through the center of the same in operation.

Similar letters of reference indicate corresponding parts in the figures.

In order that others skilled in the art to which my invention appertains may be enabled to make and use the same, I will describe the apparatus I have used with my improvements. It is not, however, necessary to limit the same to the particular form of instrument shown in its several parts; but my improvements, as hereinafter claimed, may be used practically in any ordinary instrument substantially in conformity to that shown, for the purposes stated and as allowed.

In the accompanying drawings, A represents a tumbler-stand, from which projects a pipe, B, connected with a reservoir having a sufficient head of water to throw a jet of spray from the pipe. A cap, C, with a foraminated top, is screwed to the upper end of the pipe B. A valve, D, is seated upward against the cap, closing, when seated, all the perforations water-tight; or inside of the pipe is placed a valve, D, which, when seated, closes the flow of water through the pipe, the valve D being depressed by the weight of the tumbler beyond or below the perforations. Rod E, to which the said valve is attached, projects from the pipe B through the cap or end thereof, terminating in a knob, F.

The valve and the pressure of the water are to be so adjusted that when rod E is not acted upon the valve will be closed by the force of the water.

The parts of the apparatus may severally be metal or other material.

The pipe B is so projected that if a tumbler or other article to be washed or rinsed be placed over it, the bottom of the tumbler will come in contact with the valve-rod, and the consequent pressure will depress the valve-rod and open the valve, causing the water to be thrown upward and outward in spray against the bottom and sides of the tumbler or article, substantially as shown.

The apparatus is designed to be used in connection with soda-water or other stands or places where tumblers or other articles are used and frequent washing or rinsing thereof may be desired.

Having thus described my invention, what I claim as new, and desire to secure by Letters Patent, is—

1. The water-pipe B, cap C, valve D, and rod E, combined in a tumbler-washer, substantially as and for the purposes shown.

2. The water-pipe B, with the rod E and a valve, D, in the said pipe, combined and arranged in a tumbler or other washer, for the purposes shown.

3. In a tumbler-washer, the combination, with a water-supply pipe having openings for the emission of the water, of a valve adapted to be opened by the weight of the tumbler, and to be closed by the current of the water in the pipe, all as and for the purpose set forth.

In testimony that I claim the foregoing I have hereunto set my hand this 29th day of July, 1876.

E. WALTON RUSSELL.

Witnesses:
JOHN W. TAYLOR,
GEO. W. TAYLOR.